United States Patent [19]

Friedman

[11] Patent Number: 4,512,247
[45] Date of Patent: Apr. 23, 1985

[54] POPCORN POPPING AND COATING APPARATUS

[76] Inventor: Aaron M. Friedman, 23200 Riverside, Apt. 437, Southfield, Mich. 48034

[21] Appl. No.: 496,052

[22] Filed: May 19, 1983

[51] Int. Cl.³ .............................................. A23L 1/18
[52] U.S. Cl. .................................. 99/323.5; 99/323.8; 99/323.9; 118/19; 118/24
[58] Field of Search ................. 99/323.5, 323.8, 323.9, 99/323.6, 323.7, 323.11; 118/19, 24

[56] References Cited

U.S. PATENT DOCUMENTS

| | | | |
|---|---|---|---|
| 3,103,871 | 9/1963 | Czulak | 99/323.8 |
| 3,323,440 | 6/1967 | Grant | 99/323.5 |
| 3,512,989 | 5/1970 | Smith | 99/323.8 |
| 4,152,974 | 5/1979 | Tienor | 99/323.8 |

*Primary Examiner*—Robert W. Jenkins

*Attorney, Agent, or Firm*—Gifford, VanOphem, Sheridan, Sprinkle & Nabozny

[57] ABSTRACT

A popcorn popping and coating machine comprising a hot air popcorn popper having a discharge chute in communication with a rotary driven receptacle. The device includes a pivoting gate which blocks passage through the chute until the popper becomes filled with popped kernels so that the kernels continue to be heated until their introduction into the coating receptacle. The coating receptacle includes a cap which is rotatably secured within a yoke and frictionally engaged against a drive wheel which is rotatably driven by a motor within the housing. A confectionary preparation receptacle is secured to the chute so that the popcorn is coated as it falls into the receptacle and tumbles against both the sidewall and bottom wall of the coating receptacle. The receptacle and the chute are positioned so that the receptacle receives every kernel as well as the confectionary preparation, passing along the chute from the popper.

15 Claims, 5 Drawing Figures

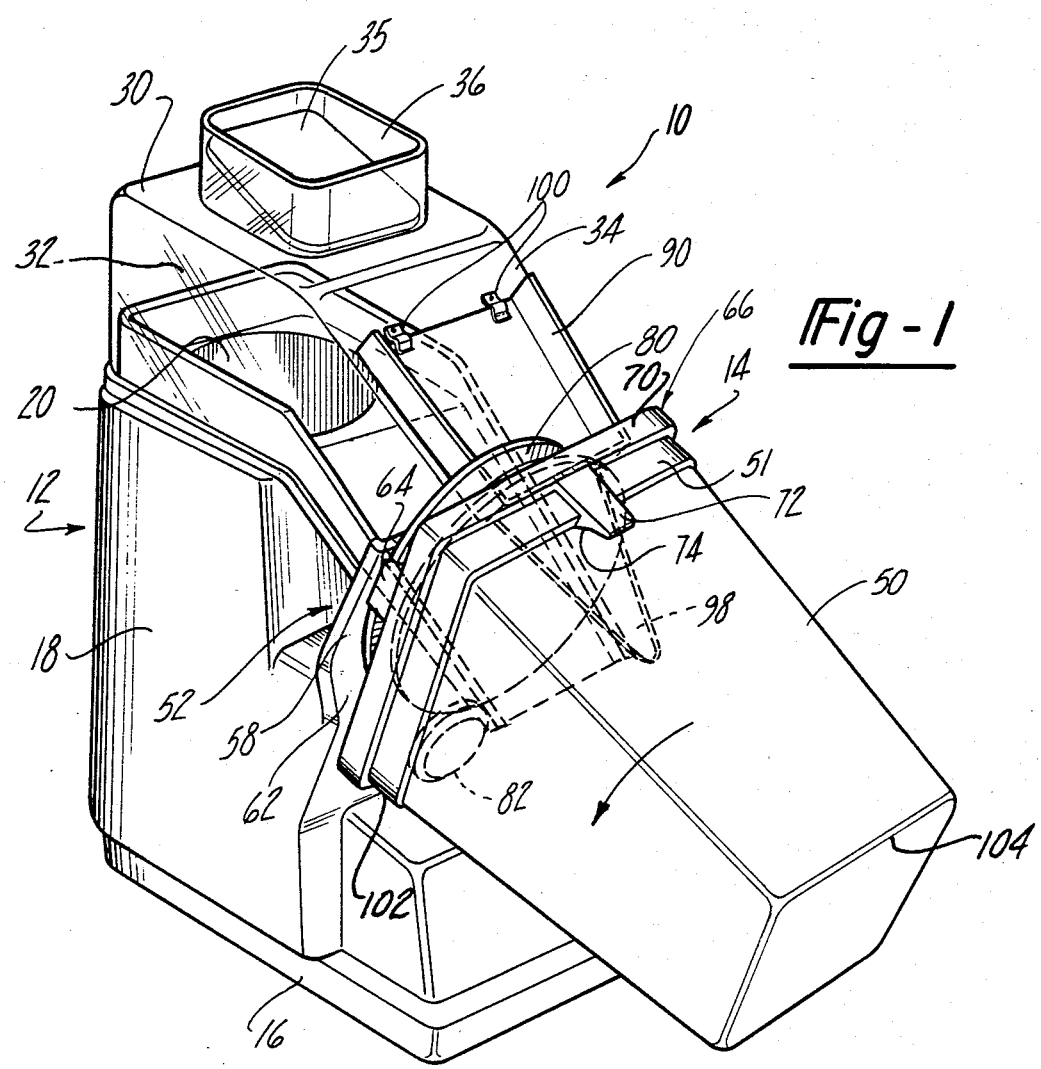
Fig-1
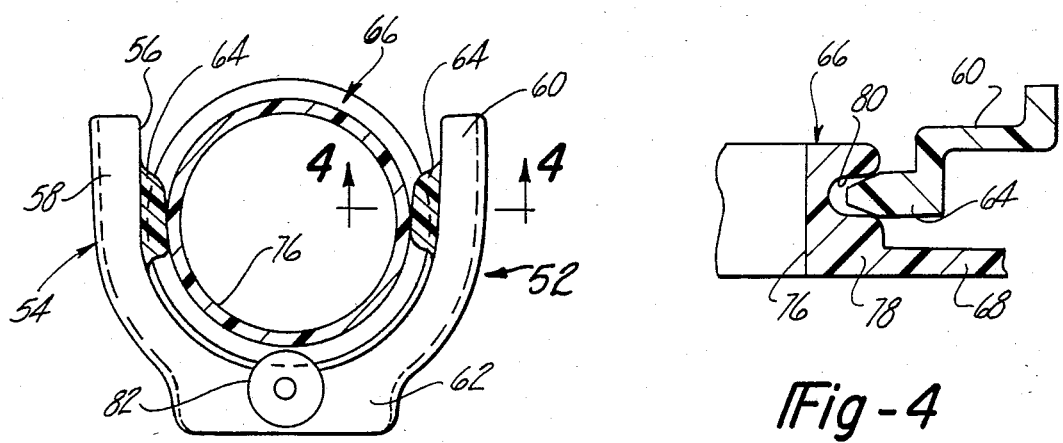
Fig-3
Fig-4

POPCORN POPPING AND COATING APPARATUS

BACKGROUND OF THE INVENTION

I. Field of the Invention

The present invention relates generally to food processing apparatus and, more particularly to apparatus for heating kernels of popcorn and coating the popped kernels with a confectionary preparation.

II. Description of the Prior Art

Popping corn, more commonly known as popcorn, is a well known and popular food product. The kernels of corn are heated until they burst to form light, fluffy and chewable vegetable matter. The popped kernels are often treated with butter, salt or other confectionary preparations to provide additional flavor to the kernels. However, the coating process is often messy and time consuming. In addition, due to the irregular shape of the popped kernels, it is often difficult to uniformly coat the popped kernels with the confectionary preparation.

Although it is likely that the process of coating corn has been mechanized for large scale production of popcorn, such devices are inappropriate for home use in order to provide readily prepared and immediately consumable portions of popcorn. In particular, there is no compact device which is convenient to use within the household for preparing and coating popcorn.

SUMMARY OF THE PRESENT INVENTION

The present invention overcomes the above-mentioned disadvantages by providing an apparatus which cooks the kernels until they pop, heats the popped kernels, and transfers the heated popped kernels to a rotating coating receptacle supplied with a confectionary preparation. The device avoids the need for handling of the popcorn during the preparation and coating process and provides mechanical means for applying a substantially uniform coating to the irregularly shaped popcorn kernels. In addition, the device is compact and easily stored when not in use. Moreover, the equipment can be easily cleaned.

In general, the apparatus comprises a popcorn popper having a housing which defines the chamber in which the unpopped kernels are placed. The housing includes means for heating the popcorn kernels to a temperature sufficient to permit the kernels to pop through the hull. Preferably, the popper is an electric hot air popper which avoids the need for supplying cooking oil to the chamber in order to heat the kernels sufficiently to enable them to pop. The popper includes an enclosed second chamber disposed above the first chamber which enables the popped kernels to continue to be heated. The device also includes a tubular housing which permits passage of the popped kernels from the heating chamber to the coating apparatus.

The coating apparatus includes a receptacle as well as means for supporting the receptacle beneath the outlet of the chute and means for rotating the receptacle about its central axis. In addition, the chute preferably supports a supply of confectionary preparation, such as butter, and a guide trough for delivering the preparation into the receptacle. Such positioning of the chute permits the preparation to be heated so that it flows freely and can easily permeate the popcorn. In addition, the receptacle is preferably aligned at an acute angle to the vertical so that the contents of the receptacle will be forced by gravity against the sidewall and bottom wall of the receptacle. In this manner, rotation of the receptacle about the axis permits a supply of confectionary preparation to be substantially uniformly distributed upon the popped kernels of corn introduced to the receptacle.

The device further comprises a base upon which the popcorn popper and the coating mechansim are fixedly positioned. However, the receptacle is removably secured to its support means so that the treated popcorn can be removed for consumption and so that accumulated deposits of confectionary preparation can be easily cleaned.

BRIEF DESCRIPTION OF THE DRAWING

The present invention will be more fully understood by reference to the following detailed description of the preferred embodiment of the present invention when read in conjunction with the accompanying drawing, in which like reference characters refer to like parts throughout the views, and in which:

FIG. 1 is a perspective view of an apparatus according to the present invention;

FIG. 3 is a sectional view taken substantially along the line 3—3 in FIG. 2;

FIG. 4 is a completed enlarged sectional view taken substantially along the line 4—4 in FIG. 3 and with parts removed for clarity.

DETAILED DESCRIPTION OF THE PREFERRED EMBODIMENT OF THE PRESENT INVENTION

Referring to FIG. 1, a popcorn cooking and coating apparatus 10 according to the present invention is thereshown comprising a popcorn popper 12 and a coating apparatus 14 mounted on a flat rigid base 16. In the preferred embodiment, the popcorn popper 12 is an electric air popper. Although such a device is particularly advantageous for several reasons which will be described in detail hereinafter, it is to be understood that the invention is not limited to this particular form of popper.

Figure 2:
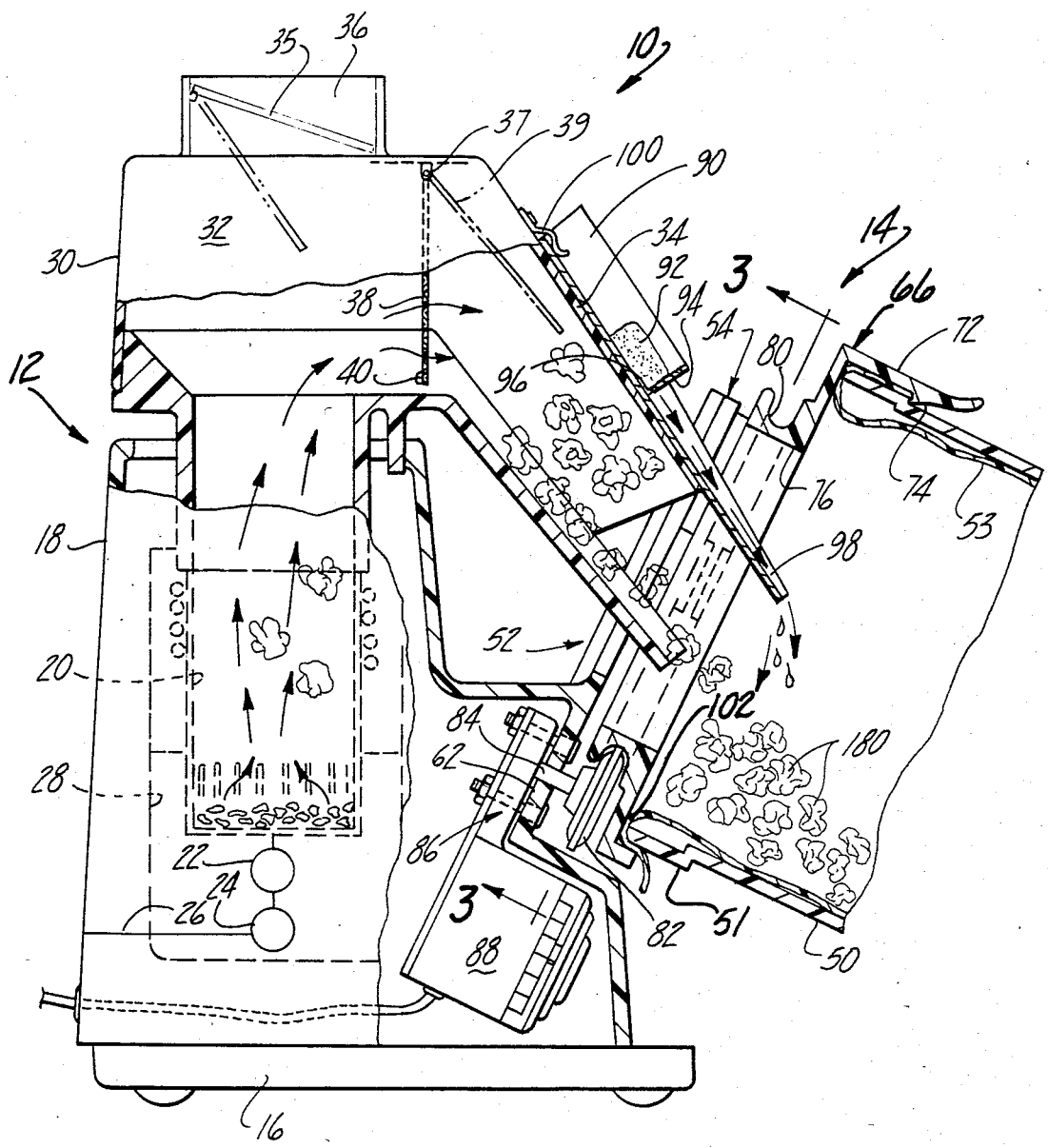
FIG. 2 is a fragmentary cross-sectional elevation of the apparatus shown in FIG. 1.

As best shown in FIG. 2, the popper 12 comprises a base housing 18 which defines a cooking chamber 20 having an open top. Air pump means 22 and heating means 24 are also carried by the housing 18 as shown diagrammatically in FIG. 2. The air pump 22 includes an inlet 26 in fluid communication with air exteriorly of the housing 18. The outlet 28 fluidly communicates with the chamber 20. The heating element 24 is disposed so that the air passing from the outlet to the chamber has been heated to a temperature sufficient to impart sufficient heat to the kernels supplied in chamber 20 so that the kernels expand and burst through their hulls.

With further reference to FIGS. 1 and 2, the popper 12 further includes a cover 30 which forms a chamber 32 above the cooking chamber 20. The cover 30 is removably secured to the base 18 of popper 12. The cover 30 also includes a chute 34 which angles downwardly away from and communicates with the chamber 32. As is previously known from some hot air poppers, the cover 30 is also conveniently provided with a loading chamber 36 to hold a predetermined amount of kernels.

A door shown diagrammatically at 35, at the bottom of chamber 36 can be opened to permit the predetermined amount of kernels to pour into the chamber 20. The cover 30 also directs the air discharged from the pump 22 through the chute 34.

However, unlike previously known hot air poppers, the chute 34 includes a screen gate 38 which is pivotally secured at one end 37 to the wall of the tubular chute 34. The gate 38 is normally positioned so that it closes the chute 34. However, the gate 38 is movable to a position 39 as shown in phantom line in FIG. 2, in response to the pressure exerted by the volumetrically expanded kernels of popcorn when the chamber 32 becomes filled with these kernels. The means for normally retaining the gate 38 in its closed position can be provided by weighing the free end of the gate with weights 40 as shown in FIG. 2, although other means such as a spring or other resiliently biasing means are equally within the scope of the present invention.

The coating apparatus 14 comprises an open topped receptacle 50, means 52 for rotatably supporting the receptacle 50 so that the open top of the receptacle 50 communicates with the outlet of the chute 34. As shown in FIG. 2, the chute 34 preferably extends partly into the interior of the receptacle 50.

In particular, referring now to FIGS. 1–3, the means 52 comprises a yoke 54 extending upwardly from the front of the housing 18, although it is to be understood that the yoke could be a separate member which is secured to the base 16 by appropriate means such as glue, bolts, or the like. Yoke 54 includes an enlarged, open topped recess 56 peripherially defined by support arms 58 and 60 integrally joined by a base portion 62. Each arm 58 and 60 includes a recessed flange 64, flanges 64 being disposed on opposite sides of the recess 56 so as to extend inwardly into the recess.

Figure 5:
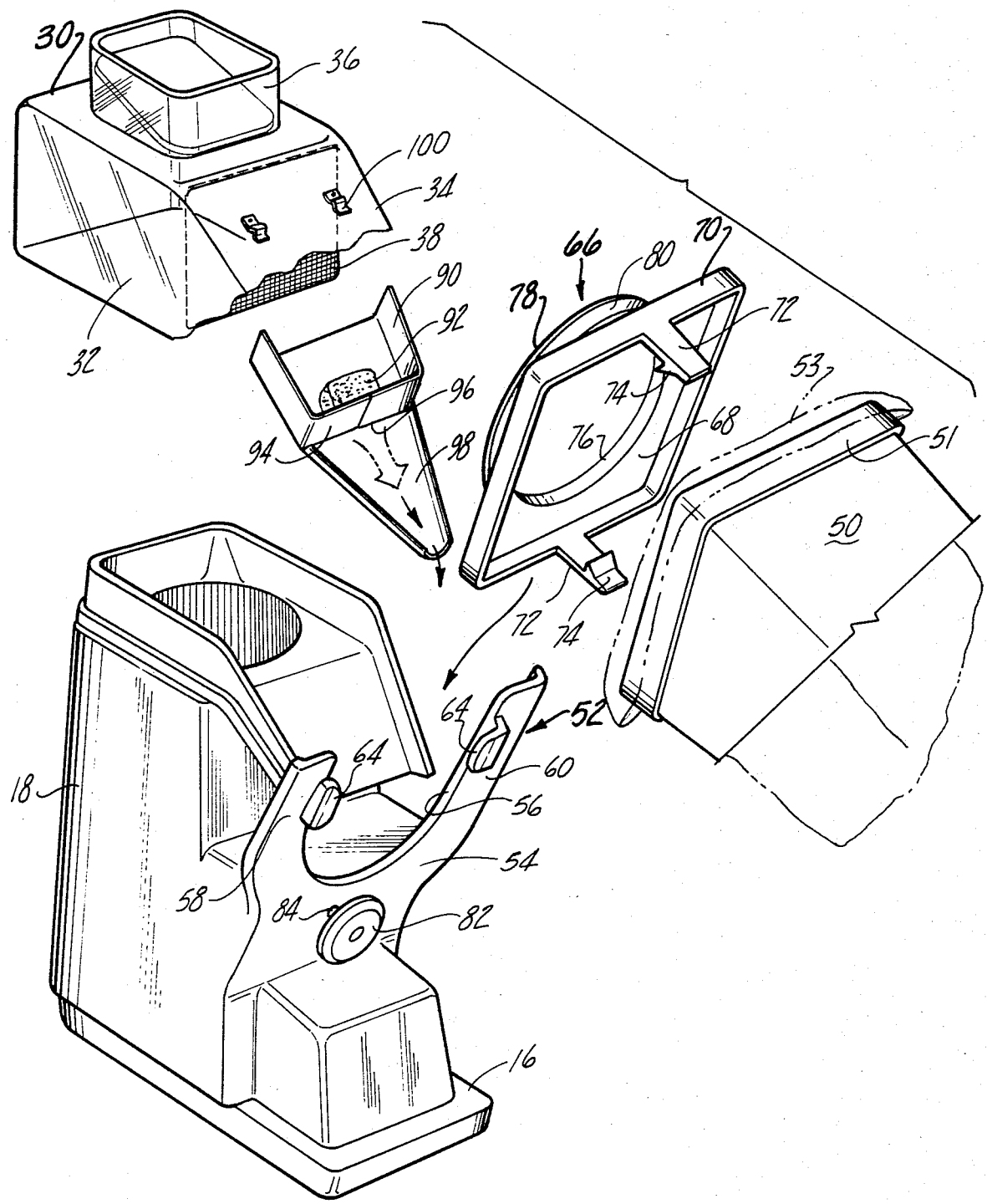
FIG. 5 is an exploded perspective view of the apparatus shown in FIG. 1, with portions removed for clarity.

The means for rotatably supporting the container also includes a connection member 66 which snaps to the top of the container 50. As best shown in FIG. 5, the connection member 66 includes an end wall 68 and a peripheral side wall 70, whereby the connection member 66 forms a cap adapted to receive the rim of the container 50. As shown in FIG. 5, the rim of the container 50 includes an expanded lip 51. A pair of flanges 72 extend from opposite sides of the peripheral wall 70 and include inwardly extending projections 74 which latch below the expanded lip 51 on the receptacle 50 to retain the connection member 66 in position on the receptacle when the rim has been inserted in the connection member 66. As shown in FIG. 5, a flexible bag type liner 53 can be inserted in the container 50, and folded over the rim so that the connection member secures the liner in the container.

The end wall 68 of the connection member 66 includes an enlarged aperture 76, which, as best shown in FIG. 2, is adapted to receive the end of the chute 34. An annular wall 78 peripherally surrounds the opening 76 and extends outwardly from the end wall 68 in a direction opposite to the peripheral side wall 70. The annular wall 78 is adapted to fit within the recess 56 in yoke 54 and includes a radial recess 80 along its perimeter which is adapted to receive the end of the projected flanges 64 therein. In addition, the radial recess 80 is adapted to receive a drive wheel 82 therein. As best shown in FIGS. 2 and 5, the drive wheel 82 is secured for rotation to an axle 84 which extends outwardly from a speed reducing drive mechanism 86 including an electric motor 88. The axle 84 extends through the yoke base 62 so that the periphery of the drive wheel 82 extends slightly into the recess 56 in the yoke 54, as shown in FIG. 3. Preferably, as shown in the drawing, the drive mechanism 86 is mounted within the housing 18.

Referring again to FIGS. 2 and 5, the present invention also includes means for supplying a confectionary preparation to the popcorn as it enters the receptacle 50. The supply means comprises a walled receptacle 90 into which a supply of confectionary preparation, such as the pat of butter 92, can be placed. The receptacle includes an end wall 94 having an aperture such as the slot 96 which permits fluid communication between the interior of the receptacle 90 and a laterally extending flow trough 98. As shown in FIG. 5, the flow trough 98 preferably includes raised side walls to direct the flow toward the end of the trough. Although the trough 98 is shown as tapered, it will be understood that it can be of any desired width in order to control the application of the confectionary preparation to the popcorn, so long as the end of the flow trough 98 fits within the opening 76 in the receptacle connector 66.

Preferably, the receptacle 90 and trough 98 are integrally connected. A pair of spring clips 100 are secured to the top wall of the chute 34 and are adapted to receive the bottom edge of the receptable 90 thereunder so as to frictionally engage the receptacle 90 and trough 98 against the top of the chute 34. Accordingly, as the chute 34 is heated by the flow of hot air through the popcorn popper, the pat of butter 92 is also heated. In addition, the inclined top wall of chute 34 positions the flow trough 98 in proper position within the opening 76 in the connection member 66 so that the confectionary preparation is applied to the heated, popped kernels as they are discharged from the chute 34.

As best shown in FIG. 2, the axis of rotation of the receptacle 50 is acutely angled with respect to the vertical and thus forms a complementary angle with respect to the base 16. Thus, the popped corn kernels 180 and confectionary preparation 92 fall against the side wall and bottom wall of the receptacle 50 and each other when the receptacle 50 is rotated. Accordingly, the confectionary preparation 92 and the kernels of corn 180 become uniformly mixed within the interior of the receptacle 50. Of course, the preferred angle of inclination of rotation of the axis is when the top corner 102 of the receptacle 50 is horizontally aligned with the bottom corner 104, whereby substantially half of the volume of the receptacle 50 can be used during the coating process. Accordingly, it can be seen that the volume of receptacle 50 is approximately twice the volume of the popped corn which is produced by the predetermined amount of kernels introduced to the popper 12 at the load chamber 36.

Having thus described the important structural features of the embodiment of the present invention, the operation of the device can easily be explained. The device is assembled so that the top 30 covers the housing 18, and the connection member 66 is secured to the top of receptacle 50. The connection member is then slid into the recess of yoke 60 so that the flanges 64 are entrained in the recess 80. Accordingly, the weight of the receptacle and the connection member cause the drive wheel 82 to engage against the connection member within recess 80. In addition, the receptacle 90 is clipped to the top wall of chute 34.

The chamber 36 is loaded with unpopped kernels of popping corn so that a predetermined amount of popping corn is introduced into the device 10. The chamber 36 is then emptied into the cooking chamber 20, and the heating means 24 and the air pump 22 are activated. The heated and forced air is supplied to the cooking chamber 20 by the pump outlet 28 so that the kernels are subjected to sufficient heat to cause the kernels to pop. Once the kernels have popped and thus volumetrically expanded, the popped kernels begin to accumulate within the chamber 20 and chamber 32 of cover 30. Although the hot air is exhausted through the screen gate 38, the gate 38 retains the popped kernels in the chamber 32 so that they continue to be heated by hot air passing through the chamber.

Whenever desired during the cooking and heating process, but preferably after the receptacle 90 has become warmed, the receptacle 90 is supplied with any desired confectionary preparation. For example, salt, butter or powdered cheese preparation can be introduced into the receptacle 90 for coating of the popped kernels. The slot 96 is appropriately sized so as to permit controlled release of the preparation from the receptacle to the trough, taking into account the consistency and viscosity of the preparation.

Once the chamber 32 has become filled with popped kernels, further volumetric expansion of the kernels caused by continuous popping, together with the force of the air against the popped kernels, forces the gate 38 to open to the position shown in phantom line at 39 in FIG. 1. Thus, the heated popped kernels enter the slanted chute 34 and are pulled by gravity along the chute into the receptacle 50. When the popcorn begins to tumble down the chute 34, motor 88 is switched on so that the receptacle 50 is rotated. At the same time, the heated confectionary preparation, preferably including melted butter 92, flows through the slot 96 and down the trough 98, by the force of gravity into receptacle 50. As the receptacle 50 rotates, it continuously mixes the popped kernels 180 with the confectionary preparation 92. Since the popped kernels are continuously heated until released past the gate 38, the flavor of the confectionary preparation more effectively permeates the popped kernels of corn so that the kernels are more uniformly coated with the confectionary preparation. Moreover, continuous rotation of the receptacle 50 causes the kernels 180 and the confectionary preparation 92 to tumble against the side and bottom walls of the receptacle 50 in order to produce intermixing of the confectionary preparation with the kernels. Since the top of the receptacle 90 remains exposed, additional confectionary preparations can be added to the receptacle 90 while popped kernels of popping corn continue to emerge from the popper 12 through the chute 34 so that controlled application of the confectionary preparation is possible.

In any event, it can be seen that when all of the kernels have popped, the entire unit can be tilted to permit all of the popped kernels to fall into the coating receptacle 50. Rotation of the receptacle 50 continues until all the popcorn and confectionary material have been thoroughly mixed. The motor 88 in drive mechanism 86 is then turned off and the receptacle 50 is then easily slid off the yoke 54. Moreover, while receptacle 50 can also be used as a serving bowl for the coated popcorn, in the preferred embodiment in which the liner bag is employed, the liner bag is removed so that the popcorn can be transferred to a more suitable container for consumption. Nevertheless, when the coated kernels have been removed from the receptacle 50, the receptacle 50 can be easily washed and replaced on the platter connection member 66 for another coating operation. The cover 30, including receptacle 90 and trough 98, can also be removed, washed and replaced on the base 18 of the popper 12 and the device is again ready for use in cooking and coating popcorn.

Thus, the present invention provides simple and quick production of coated popcorn which is especially adapted for use in preparing fresh, readily consumable servings. Moreover, the device is easily cleaned since both the cover 30 and the receptacle 50 are easily removable from the remaining portions of the apparatus. In addition, since the platform 54 and the housing 18 are fixedly secured to base 16, the popper 12 and the coating device 14 are fixedly positioned relative to each other so that spillage and waste of the popcorn is avoided. Moreover, the device provides application of a uniform coating on the popcorn prepared. Thus, the present invention provides a quick, efficient and simple to use device for the preparation of a flavorful but inexpensive snack.

Having thus described the present invention, many modifications thereto will become apparent to those skilled in the art to which it pertains without departing from the scope and spirit of the present invention as defined in the appended claims.

What is claimed is:

1. An apparatus for coating popping corn kernels and coating the popped kernels comprising:
  a base;
  a first housing secured to said base, said housing defining a chamber for holding popping corn kernels and including a means for heating said popping corn kernels to a temperature sufficient to permit kernels of popping corn to pop;
  a receptacle;
  means secured to said base for supporting and rotating said receptacle;
  passage means for transferring popped kernels from said chamber to said receptacle, said passage means comprising a second housing removably secured to said first housing and defining a tubular chute extending between said chamber and said receptacle;
  gate means secured to said chute, for normally closing said chute; said gate means comprising means responsive to the volumetric expansion of cooked popping corn to open said gate means so that popped corn continues to be heated by said heating means until a predetermined accumulation of volumetrically expanded kernels opens said gate and permits passage of said kernels from said chamber to said receptacle.

2. The invention as defined in claim 1 wherein said means for heating comprises an air pump and means for heating the air discharged from said pump.

3. The invention as defined in claim 1, wherein said passage means comprises a second housing removably secured to said first housing defining a tubular chute extending between said chamber and said receptable.

4. The invention as defined in claim 3 and further comprising means for introducing a confectionary preparation into said receptacle.

5. The invention as deffined in claim 1, wherein said gate means comprises a screen and said responsive means comprises means for resiliently biasing said screen to a position obstructing said chute.

6. The invention as defined in claim 5, wherein said chute comprises a tubular housing and said screen is pivotally secured at one end to said tubular housing.

7. The invention as defined in claim 1, wherein said receptacle is an open topped housing, and wherein said means for supporting and rotating said receptacle comprises a cap, means for securing said cap to the top of said receptacle, and means for rotatably driving said cap.

8. The invention as defined in claim 7, wherein the rotational axis of said receptacle coincides with the axis of said receptacle.

9. The invention as defined in claim 8, wherein the axis of said receptacle is acutely angled with respect to the vertical.

10. The invention as defined in claim 1, wherein said introduction means comprises a confection receptacle, and means for securing the confection receptacle to the top of said chute.

11. The invention as defined in claim 10 and further comprising a trough extending from said confection receptacle to the end of said chute.

12. An apparatus for cooking popping corn kernels and coating the popped kernels comprising:
- a base;
- a first housing secured to said base, said housing defining a chamber for holding popping corn kernels and including a means for heating said popping corn kernels to a temperature sufficient to permit kernels of popping corn to pop;
- a receptacle wherein said receptacle is an open topped housing;
- means secured to said base for supporting and rotating said receptacle, said means comprising a cap;
- means for securing said cap to the top of said receptacle;
- means for rotatably driving said cap; and
- passage means for transferring popped kernels from said chamber to said receptacle.

13. The invention as defined in claim 12, wherein said chute includes gate means for normally closing said chute, said gate means comprising means responsive to the volumetric expansion of cooked popping corn for opening said gate means so that popped corn continues to be heated by said heating means until a predetermined accumulation of volumetrically expanded kernels opens said gate and permits passage of said kernels from said chamber to said receptable.

14. An apparatus for cooking popping corn kernels and coating the popped kernels comprising:
- a base;
- a first housing secured to said base, said housing defining a chamber for holding popping corn kernels and including a means for heating said popping corn kernels to a temperature sufficient to permit kernels of popping corn to pop;
- a receptacle;
- means secured to said base for supporting and rotating said receptacle;
- passage means for transferring popped kernels from said chamber to said receptacle said passage means comprising a second housing removably secured to said first housing defining a tubular chute extending between said chamber and said receptacle;
- means for introducing a confectionary preparation into said receptacle; and
- said last mentioned means comprising a confection receptacle, and means for securing the confection receptacle to the top of said chute.

15. An apparatus for cooking popping corn kernels and coating the popped kernels comprising:
- a base;
- a first housing secured to said base, said housing defining a chamber for holding popping corn kernels and including a means for heating said popping corn kernels to a temperature sufficient to permit kernels of popping corn to pop;
- a receptacle;
- means secured to said base for supporting and rotating said receptacle;
- passage means for transferring popped kernels from said chamber to said receptacle said passage means comprising a second housing removably secured to said first housing defining a tubular chute extending between said chamber and said receptacle;
- means carried by said chute for introducing a confectionary preparation into said receptacle.

* * * * *

UNITED STATES PATENT AND TRADEMARK OFFICE
CERTIFICATE OF CORRECTION

PATENT NO. : 4,512,247
DATED : April 23, 1985
INVENTOR(S) : Aaron M. Friedman

It is certified that error appears in the above-identified patent and that said Letters Patent is hereby corrected as shown below:

Column 2, line 7 delete "mechansim" insert --mechanism--.

Column 4, line 25 delete "receptable" insert --receptacle--

Column 5, line 68 delete "platter".

Column 6, line 63 delete "deffined" insert --defined--.

Signed and Sealed this

Twentieth Day of August 1985

[SEAL]

Attest:

DONALD J. QUIGG

Attesting Officer   Acting Commissioner of Patents and Trademarks